United States Patent
Charles (10) Patent No.: US 11,892,365 B2
(45) Date of Patent: Feb. 6, 2024

(54) TORQUE OVERLOAD DETECTION AND CONTROL SYSTEMS

(71) Applicant: L3Harris Technologies, Inc., Melbourne, FL (US)

(72) Inventor: David Charles, Charlotte, NC (US)

(73) Assignee: L3Harris Technologies, Inc., Melbourne, FL (US)

( * ) Notice: Subject to any disclaimer, the term of this patent is extended or adjusted under 35 U.S.C. 154(b) by 176 days.

(21) Appl. No.: 17/668,095

(22) Filed: Feb. 9, 2022

(65) Prior Publication Data

US 2023/0251153 A1 Aug. 10, 2023

(51) Int. Cl.
*G01L 5/00* (2006.01)
*G01L 5/24* (2006.01)

(52) U.S. Cl.
CPC .......... *G01L 5/0071* (2013.01); *G01L 5/0042* (2013.01); *G01L 5/24* (2013.01)

(58) Field of Classification Search
CPC ........ G01L 5/0071; G01L 5/0042; G01L 5/24
See application file for complete search history.

(56) References Cited

U.S. PATENT DOCUMENTS

| | | | | |
|---|---|---|---|---|
| 5,041,721 A | * | 8/1991 | Smith | G06M 7/04 377/6 |
| 2017/0335899 A1 | * | 11/2017 | Mellor | F16D 43/211 |

* cited by examiner

*Primary Examiner* — Paul M. West
(74) *Attorney, Agent, or Firm* — Edell, Shapiro & Finnan, LLC (57) ABSTRACT

A system that includes a driving component, such as a motor, and a driven component. The system also includes a torque limiter positioned between the driving component and the driven component. The driving component is coupled to a driving end of the torque limiter and the driven component is coupled to a driven end of the torque limiter. The torque limiter is configured to assume a normal operating state with no slippage between the driving and driven ends of the torque limiter and an over-torque operating state with slippage occurring between the driving and driven ends of the torque limiter. The torque limiter includes a metal moving part that assumes a first position when the torque limiter is in the normal operating state and a second position different than the first position when the torque limiter assumes the over-torque operating state. An inductive proximity sensor monitors the position of the metal moving part.

19 Claims, 6 Drawing Sheets

TORQUE OVERLOAD DETECTION AND CONTROL SYSTEMS

TECHNICAL FIELD

The present invention relates to a method of determining the state of a torque limiter that is located between a driving component and a component to be driven.

BACKGROUND

The navigational components of an underwater vehicle typically include a number of external fins that are rotated to maneuver the vehicle as needed. In the event a fin inadvertently impacts an obstacle that hinders its rotation while being driven by a servo motor, the fin and/or the servo motor can be damaged or destroyed to hinder vehicle control and stability, or rending the vehicle inoperable.

For optimal vehicle stability and control, the fins are typically made of a stiff plastic. However, the use of stiff fins make it more likely that motor damage will occur when the fin impacts an obstacle. To avoid this path to failure, current industry practice is to make fins out of a soft rubber so that so that the fin absorbs some of the impact to reduce the stress on the motor. However, using soft rubber for the fins significantly affects vehicle dynamics making it more difficult to control vehicle stability. Underwater vehicles are often used for imagery. Quality imagery requires a stable platform.

Another industry practice is to use a rudder instead of independently controlled fins, and to guard the rudder with a cage to protect it from impacting underwater objects. However, the rudder is not as effective as using independently controlled fins. In addition, the cage protecting the rudder adds unwanted weight and drag to the vehicle which requires more power for propelling the vehicle through the water. This places more load on the batteries that power the vehicle requiring that they be recharged more frequently.

Furthermore, fins and the motors that drive them are typically located on opposite sides of a sealed pressure vessel of the underwater vehicle with the motor and other associated equipment located inside the pressure vessel and the fin located outside the pressure vessel. Repairing damaged equipment inside the pressure vessel is very time consuming and expensive in that it requires the vehicle to be removed from the water and that seals be broken in order to gain access to the damaged components. For this reason, it is important to avoid damage to the components located inside the underwater vehicle.

SUMMARY

In the examples disclosed herein, focus is placed on the use of torque limiters to protect driving and driven components of an underwater vehicle, such as an autonomous underwater vehicle. The navigational components of an underwater vehicle typically includes a number of external fins that are rotated to maneuver the vehicle as needed. In the event a fin inadvertently impacts an obstacle that hinders its rotation while being driven by a servo motor, and without a torque limiter being disposed between them, the servo motor and/or the fin may be damaged necessitating that one or both be replaced.

Disclosed herein is a system of an underwater vehicle that is designed to protect navigational fins of the underwater vehicle and the motors that drive them in the event a fin is obstructed by an underwater object while the fin is being driven by the motor.

According to one implementation, the system includes a high resolution servo motor, a torque limiter and an inductive proximity sensor. Upon an over-torque impact on a fin, the torque limiter physically disengages the fin from the servo motor that drives it such that torque can no longer be transmitted between the two. Simultaneously, the inductive proximity sensor recognizes the over-torque condition and sends an electrical signal to a central processing unit (CPU) associated with the navigational system of the vehicle to alert it of the over-torque condition. Once this signal is received, the CPU or associated controllers can control the servo motor to stop its rotation, reduce its rate of rotation or reverse its direction of rotation. When the over-torque condition is determined to no longer exists, the CPU can control the servo motor in a pre-determined motion pattern to cause the torque limiter to re-engage the connection between the servo motor and the fin.

Torque limiters work by slipping during torque overload to prevent driving and driven components from experiencing excessive torque loads. If a torque overload occurs, the torque limiter is able to protect critical equipment by disconnecting the driving component from the driven component. In the examples disclosed herein, the servo motor is the driving component and the fin is the driven component.

According to one implementation, the torque limiter is a detenting safety clutch based on the ball-recess principle. A ball detent type limiter transmits force through hardened balls which rest in detents on the shaft and are held in place with springs. An over-torque condition pushes the balls out of their detents, thereby decoupling the shaft. According to one implementation, the safety clutch includes a floating plate that assumes a first axial position when the balls rest in their detents, the floating plate assuming a second axial position when the balls are pushed out of their detents. The first axial position being an engagement position in which there is no slippage. That is, as the servo motor rotates, so does the fin. The second axial position being a disengagement position in which slippage occurs. In use, the torque limiter/safety clutch couples the shaft of the servo motor to an axel of the fin.

Proximity sensors are sensors that detect the presence of a metal object without making physical contact with the object and converts information captured into an electrical output signal.

As noted above, the system includes an inductive proximity sensor that is used to determine when an over-torque condition exists or not. The proximity sensor has no physical moving parts. Instead, it allows signals to transmit through it when something that is being monitored comes into close proximity to the sensing area.

An inductive proximity sensor typically has four main components. They are a coil, an oscillator, a trigger switch and an output circuit. The coil is configured to generate an electromagnetic field and is typically held in a cup-shaped core that concentrates the coil's magnetic field on the front area of the sensor. The oscillator is configured to produce a radio frequency that helps generate the electromagnetic field. The trigger switch senses the change in amplitude of oscillation and produces a corresponding signal that is sent to the output circuit. The output circuit typically comprises a transistor. After receiving a signal from the trigger switch, the transistor switches on to produce an output signal.

An inductive proximity sensor operates on the basis of Faraday's law of induction. According to Faraday's law of induction, when one electrically conducting object is placed in a magnetic field, then an electric current (called an eddy current) will be generated in the object. According to Len's law, the eddy current creates a magnetic field in a conductor and this eddy current magnetic field opposes the magnetic field that created it. When the sensing coil in the oscillation circuit is supplied with alternating current, a changing magnetic field is created around the coil. When the target object enters the electromagnetic field, some of the electromagnetic energy is transferred to the object. This causes an eddy current to be generated inside the object. This eddy current produces another electromagnetic field called an eddy current magnetic field and it opposes the magnetic field created by the coil of the proximity sensor.

As the eddy current magnetic field opposes the magnetic field of the coil, the intensity of the magnetic field of the coil reduces. As the target comes close to the sensor the eddy current increases causing the amplitude of the electromagnetic field of the coil to decrease. The trigger circuit monitors the amplitude and when the amplitude goes below a predetermined level, a signal is sent to the output circuit where the transistor switches on.

As noted above, according to one implementation the torque limiter/safety clutch includes a floating plate that moves between first and second axial positions, the first axial position being an engagement position (indicative of there being no torque overload) and the second axial position being a disengagement position (indicative of an existence of a torque overload).

According to one implementation, the inductive proximity sensor determines that an over-torque condition exists by monitoring the position of the metal floating plate, This is accomplished by placing the sensing area of the proximity sensor in a location such that (a) when the floating plate is in the first axial position the electromagnetic field created by the sensor coil produces insufficient eddy current in the floating plate to produce an opposing magnetic field that is strong enough to cause an activation of the trigger switch and (b) when the floating plate is in the second axial position the electromagnetic field created by the coil produces sufficient eddy current in the floating plate to produce an opposing magnetic field that is strong enough to cause an activation of the trigger switch. As a consequence, according to one implementation, when the floating plate of the torque limiter is in the first axial position, no output signal from the output circuit of the proximity sensor is sent to a CPU of the navigation system and the navigation system operates in a normal state. Conversely, when the floating plate of the torque limiter is in the second axial position, an output signal from the output circuit of the proximity sensor is sent to a CPU of the navigation system and the navigation system operates in an over-torque state. The over-torque state can include the navigation system terminating power to an affected servo motor, or otherwise controlling the servo motor in a way to overcome the over-torque condition. When the over-torque condition is resolved, the floating plate of the torque limiter returns to its first axial position and output from the proximity sensor ceases such that the navigation system may be returned to its normal state.

According to another implementation, the inductive proximity sensor and the torque limiter are arranged such that when the torque limiter is in a normal operating state (with no slippage), the inductive proximity sensor is arranged sufficiently close to the floating plate to cause the proximity sensor to generate an output signal that is received in the CPU of the underwater vehicle. Conversely, when the torque limiter is in an over-torque state (with slippage), the inductive proximity sensor is arranged away from the floating plate to cause the proximity sensor to stop generating the output signal. Thus, when the CPU receives an output signal from the proximity sensor it is indicative of the torque limiter being in a normal operating state, and when the CPU ceases to receive an output signal from the proximity sensor it is indicate of the torque limiter being in an over-torque state. When the over-torque condition is resolved, the floating plate of the torque limiter returns to its first axial position and the proximity sensor again outputs a signal to the navigation system CPU so that the CPU may its normal navigational functions.

The ability to monitor the state of the torque limiter in the manner disclosed above advantageously allows for computer implemented actions or user implemented actions to occur immediately upon the initiation of an over-torque condition. This allows for prompt human or computer implemented intervention to prevent or minimize damage to the underwater vehicle.

These and other advantages and features will become evident in view of the drawings and detailed description.

As explained above, the underwater vehicle navigational system disclosed above is only one of many examples in which the concepts disclosed and contemplated herein may be applied. In a broader sense, the disclosure applies to any system in which an inductive proximity sensor monitors a moving part of a torque limiter to determine whether the torque limiter is in a normal operating state (no slippage) or in an over-torque state (with slippage).

More generally, the torque overload detection and control system may include a driving component, such as a motor, and a driven component with there being a torque limiter positioned between them. The driving component being coupled to a driving end of the torque limiter and the driven component being coupled to a driven end of the torque limiter. The torque limiter is configured to assume a normal operating state with no slippage between the driving and driven ends of the torque limiter and an over-torque operating state with slippage occurring between the driving and driven ends of the torque limiter. The torque limiter includes a metal moving part that assumes a first position when the torque limiter is in the normal operating state and a second position different than the first position when the torque limiter assumes the over-torque operating state. An inductive proximity sensor is arranged near a portion of the metal moving part and is configured to generate an output signal upon detecting the metal moving part to be in one of the first position or second position. When the metal moving part is in the other of the first position or second position, the inductive proximity sensor is configured not to generate the output signal. Upon receiving or not receiving an output signal from the proximity sensor, as the case may be, a controller associated with the proximity sensor can determine if a torque overload situation exists and may then control the driving component in a manner that prevents or minimizes damage to one or both of the driving and driven components.

DETAILED DESCRIPTION

As explained above, although the examples disclosed herein are directed to a navigation system of an underwater vehicle, the invention is not limited to such applications.

Figure 1A:
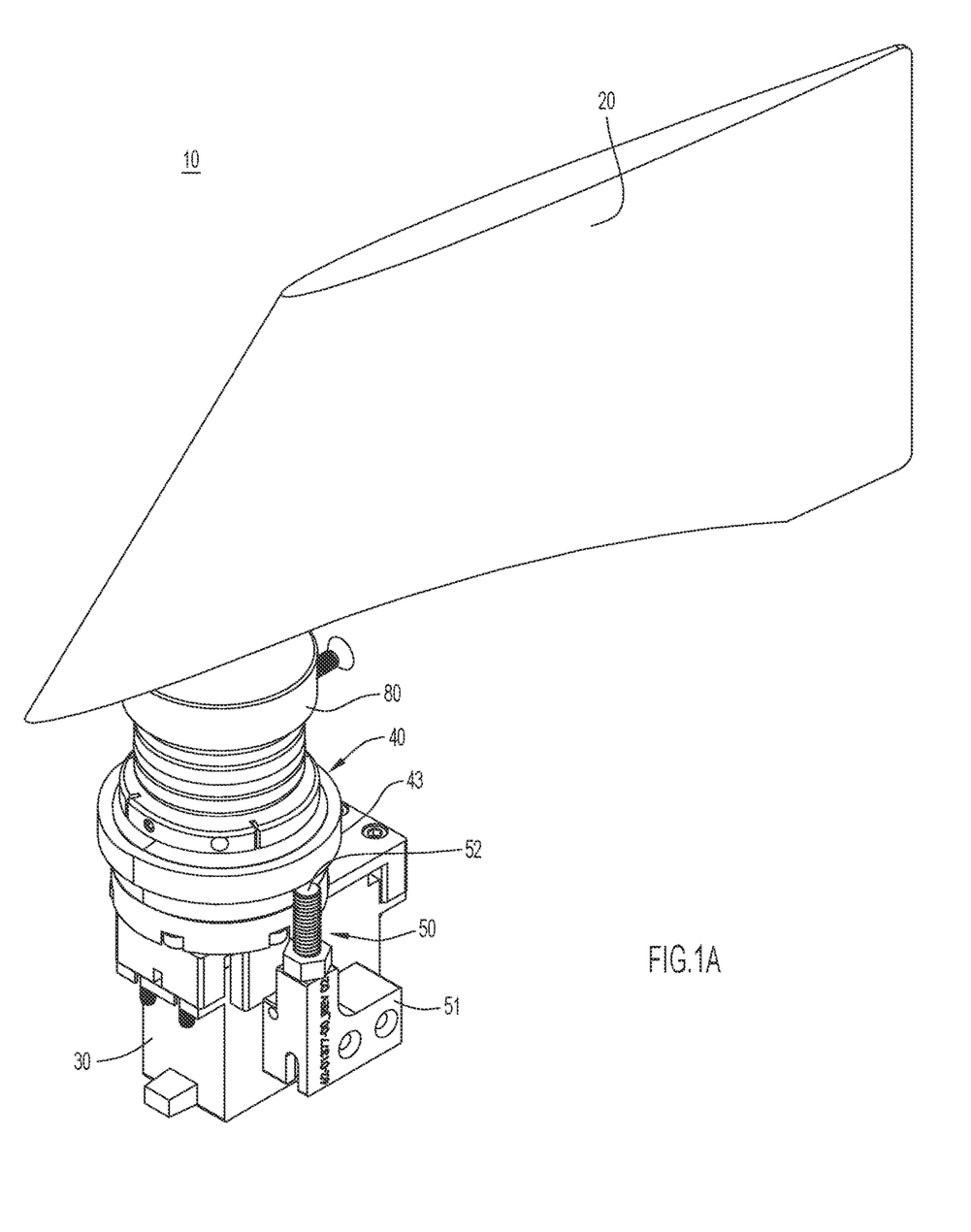
FIG. 1A is a perspective view of a servo motor and fin assembly for an underwater vehicle according to one implementation.
Figure 1B:
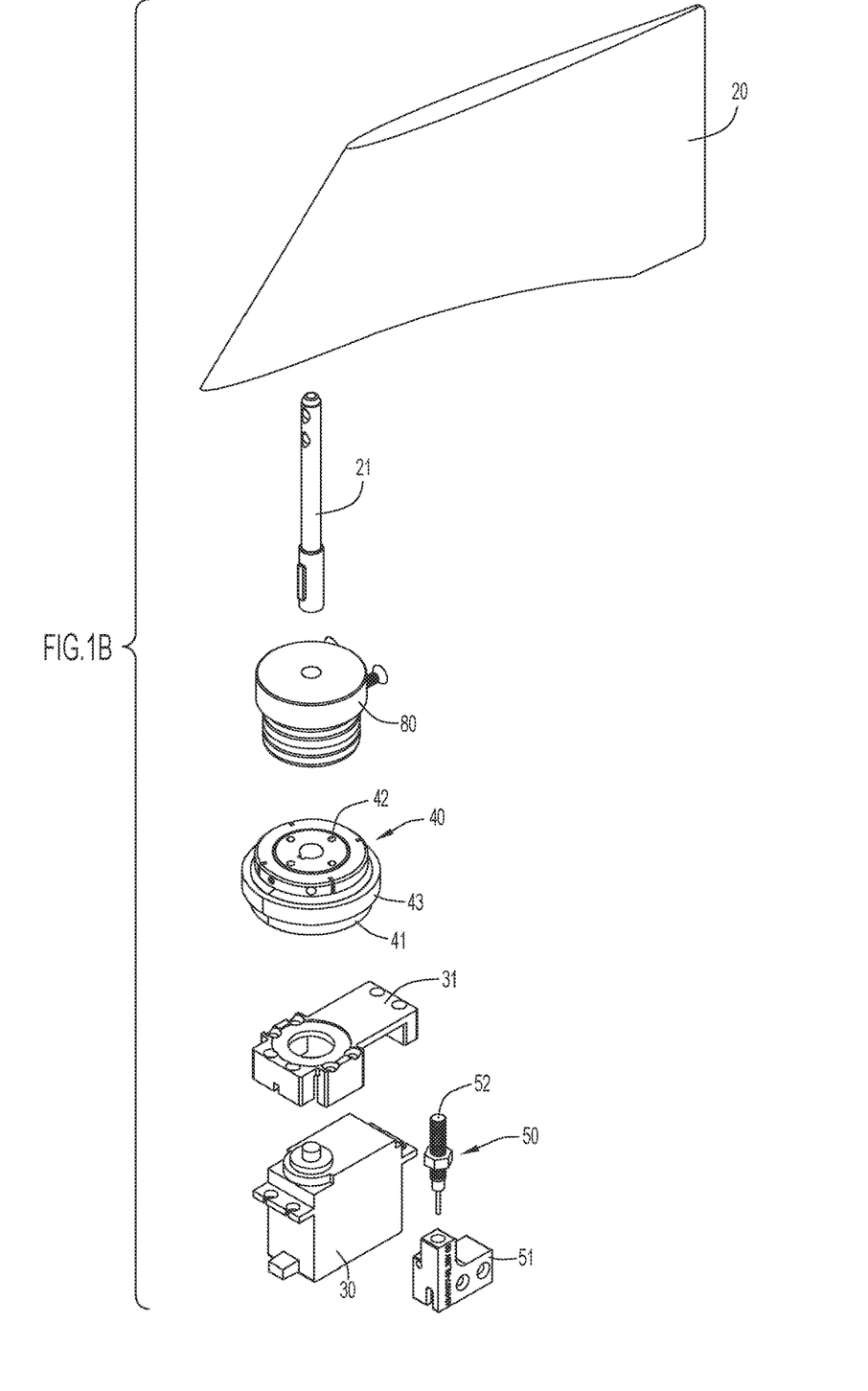
FIG. 1B is an exploded view of the assembly of FIG. 1A.

FIG. 1A shows a perspective view of a fin drive assembly 10 of an underwater vehicle (not shown). FIG. 1B is an exploded view of the assembly of FIG. 1A. The assembly 10 includes a fin 20 that is operatively coupled to a servo motor 30 by a torque limiter 40. As discussed above, the fin 20 and a part of its axel 21 is configured to be located outside the underwater vehicle, while the servo motor 30, torque limiter 40 and proximity switch 50 are configured to be located inside a pressurized vessel of the underwater vehicle. To seal the pressurized vessel a seal unit 80 is disposed between the fin 20 and the torque limiter 40, the seal unit being configured to seal against both the axel 21 and also an opening in the underwater through which the axel passes. A bracket 31 disposed between the servo motor 30 and torque limiter 40 is provided to assist in securing the servo motor 30 to the underwater vehicle and to facilitate a coupling of the servo motor to the torque limiter 40.

Figure 2:
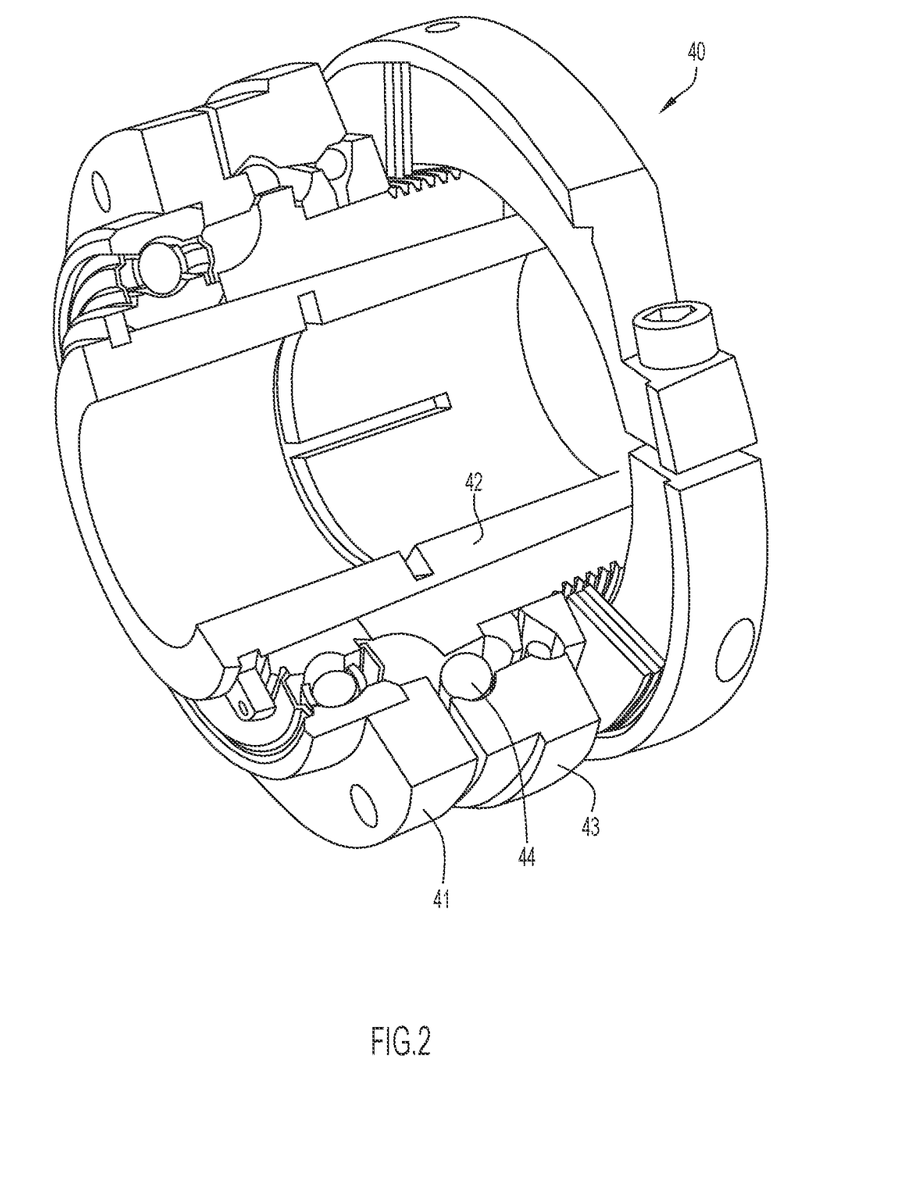
FIG. 2 is a perspective view of a torque limiter according to one implementation.

With reference to FIG. 2, according to one implementation the torque limiter 40 is an EAS® Compact® synchronous safety clutch based on the ball-recess principle. The EAS® Compact® synchronous safety clutch is manufactured by Mayre® Antriebstechnik located in Mauersteiten, Germany. The assembly 10 also includes an inductive proximity sensor 50 that is supported by a bracket 51 that is attached to the body of the servo motor 30. According to one implementation the proximity sensor 50 is manufactured by Omron Corporation of Kyoto, Japan under part number E2EC-CR5C1. As shown in FIG. 1A, a sensing area 52 of the proximity sensor 50 is located near a moving part 43 of the torque limiter 40 and is configured to monitor the position of the moving part in order that an electronic controller or an operator of the underwater vehicle may be alerted when a torque overload condition occurs so that action to mitigate the condition can be immediately initiated. According to one implementation, the metal moving part 43 has a circumferential lip portion 43a that protrudes radially from a body of the torque limiter, the inductive proximity sensor 50 being arranged such that the electromagnetic field creates an eddy current in the lip portion of the metal moving part when the metal moving part is in the first position.

With reference to FIGS. 1B through 3B, the torque limiter 40 includes a driving part 41 to which a shaft 31 of the servo motor 30 is coupled and a driven part 42 to which an axel 21 of the fin 20 is coupled. In FIGS. 2 and 3A the torque limiter 40 is shown in a normal operating state wherein the balls 44 of the device are located in their respective recesses 45 and the driving and driven parts 41 and 42 rotate in a one-to-one ratio such that a single rotation of the driving part results in a single rotation of the driven part. In other words, no torque overload condition exists and there is no slippage between parts 41 and 42.

Figure 3A:
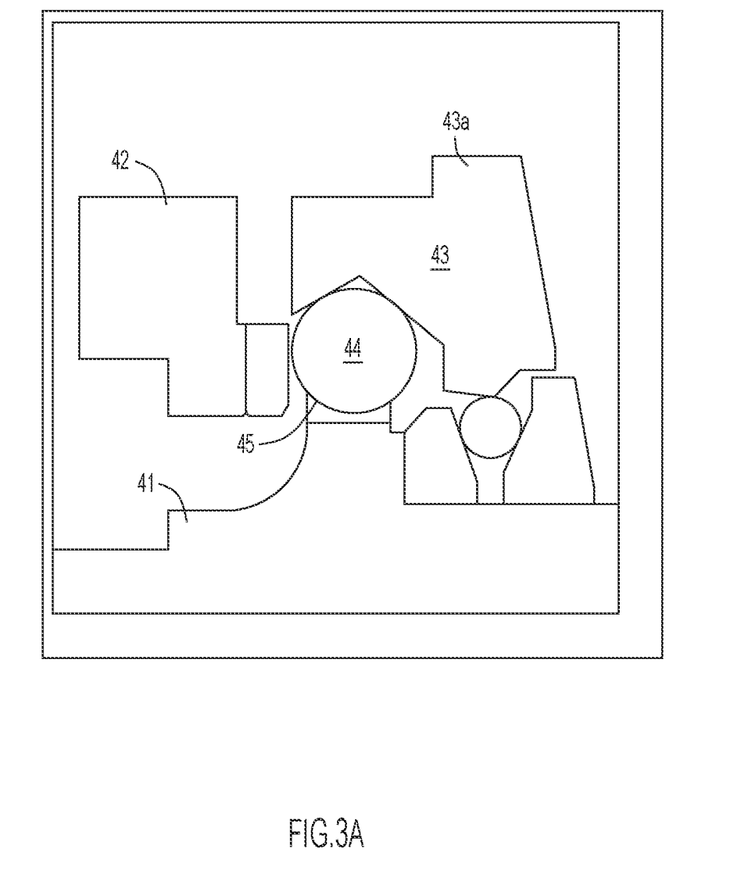
FIG. 3A is a side cross-section view of a toque limiter in a normal operating state (no slippage).
Figure 3B:
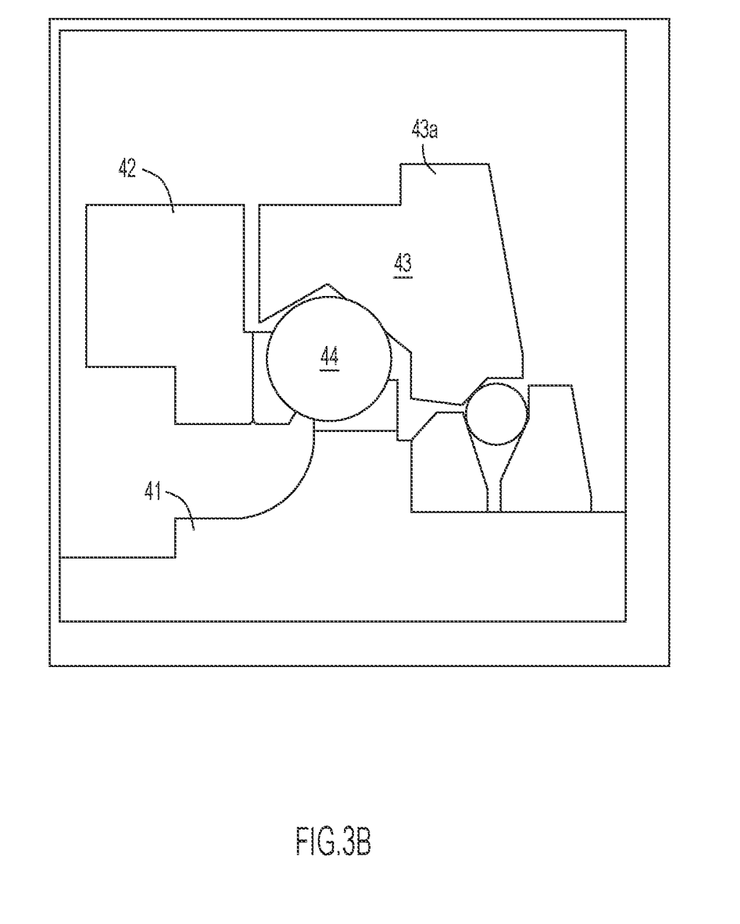
FIG. 3B is a side cross-section view of the torque limiter of FIG. 3A in an over-torque state (with slippage).

Turning now to FIG. 3B, the torque limiter 40 is shown in a torque overload state in which the balls 44 have been pushed out of their recesses 45 and have acted on the moving part 43 to cause it to shift in a direction towards the fin 20. As noted above, the torque overload condition may occur as a result of the fin 20 impacting against an object in the water.

The distance between the sensing area 52 of the inductive proximity sensor 50 and the moving part 43 varies depending on the state of the torque limiter 40. In the implementation depicted in the figures, when the torque limiter 40 is in a normal operating state (no slippage) the sensing area of the inductive proximity sensor is located a first distance away from the moving part 43, and when the torque limiter 40 is in a torque overload state it is located a second distance away from the moving part 43, the second distance being greater than the first distance. In accordance with this arrangement, due to its proximity to the moving part 43, the electromagnetic field produced by the proximity sensor 50 is capable of producing an eddy current in the moving part 43 and to subsequently produce an output signal when the torque limiter is in the normal operating state. However, when the torque limiter 40 is in a torque overload state, the distance between the sensing area 52 of the proximity sensor 50 and the moving part 43 is increased to reduce or eliminate the production of an eddy current in the moving part 43 in a manner sufficient to cause the sensor to stop producing the output signal. Thus, in the implementation depicted in the figures, when the torque limiter 40 is in the normal operating state the proximity sensor 50 continuously emits the output signal.

Figure 4:
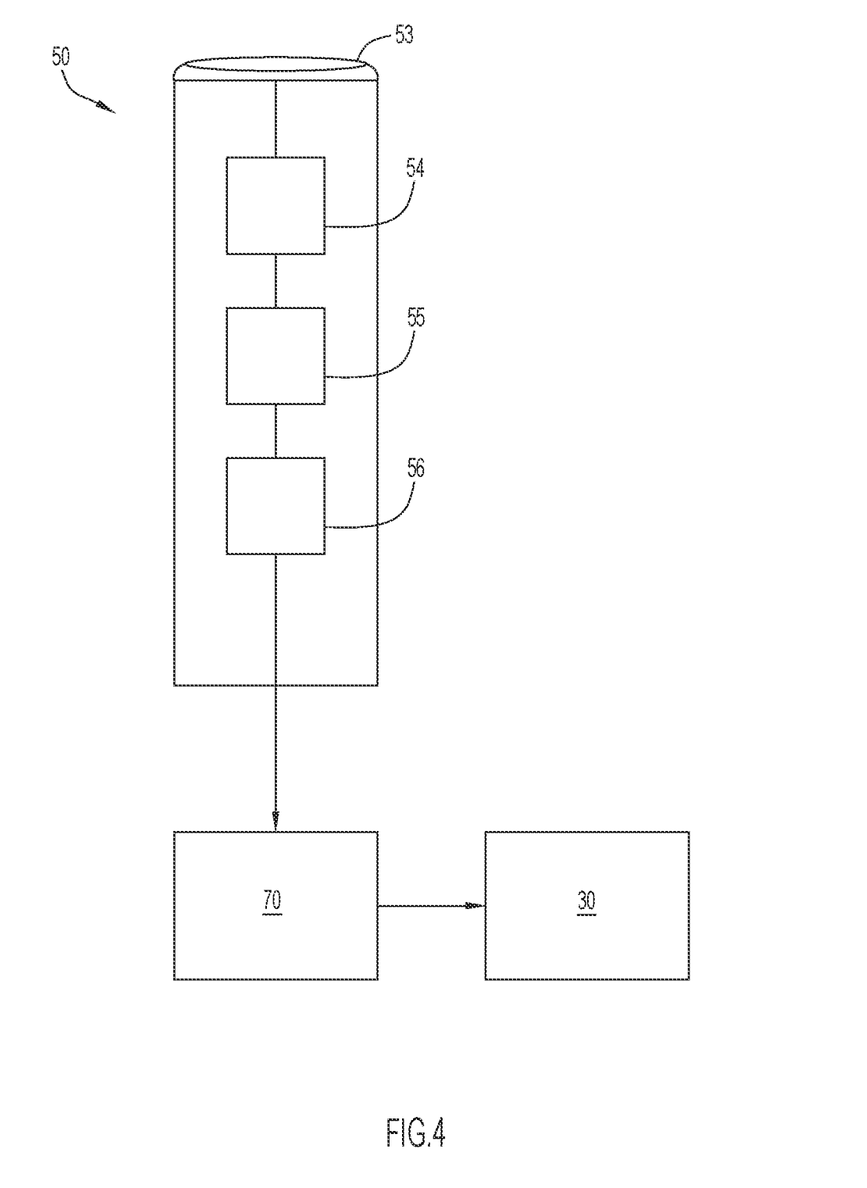
FIG. 4 illustrates a inductive proximity sensor and an associated control circuit for controlling the operation of a servo motor.

As shown in FIG. 4, the assembly may also include a central processing unit/controller 70 that is configured to receive the output signal from the proximity sensor 50. In the implementation depicted in the figures the controller 70 jumps into action to control the servo motor 30 when the proximity sensor 50 ceases sending an output signal to the controller. The actions taken by the controller 70 may be one or more of: (1) stopping the rotation of the servo motor, (2) reducing the rotation rate of the servo motor and (3) altering the rotation direction of the servo motor. According to one implementation, the controller 70 is a part of the navigation system of the underwater vehicle.

According to a second implementation not shown in the figures, the proximity sensor 50 is located on an opposite side of the moving part 43 of the torque limiter 40 (the side facing towards the fin 20) such that when the torque limiter 40 is in a normal operating state (no slippage) the sensing area of the inductive proximity sensor is located a first distance away from the moving part 43, and when the torque limiter 40 is in a torque overload state the sensing area is located a second distance away from the moving part 43, the second distance being less than the first distance. In accordance with this arrangement, due to its proximity to the moving part 43, the electromagnetic field produced by the proximity sensor 50 is capable of producing an eddy current in the moving part 43 and to subsequently produce an output signal when the torque limiter is in the torque overload state. However, when the torque limiter 40 is in the normal operating state, the distance between the sensing area 52 of the proximity sensor 50 and the moving part 43 is increased to reduce or eliminate the production of an eddy current in the moving part 43 in a manner sufficient to cause the sensor to stop producing the output signal. Thus, the torque limiter 40 produces an output signal only upon the torque limiter 40 assuming the torque overload state.

In regard to the second implementation, the central processing unit/controller 70 is configured to initiate corrective measures upon receiving the output signal from the proximity sensor 50. That is, the controller 70 takes action to control the servo motor 30 when the proximity sensor 50 sends an output signal to the controller, The actions taken by the controller may be one or more of: (1) stopping the rotation of the servo motor, (2) reducing the rotation rate of the servo motor and (3) altering the rotation direction of the servo motor.

FIG. 4 illustrates an inductive proximity sensor according to one implementation. The inductive proximity sensor 50 includes a coil 53, an oscillator 54, a trigger switch 55 and an output circuit 56. The coil 53 is configured to generate an electromagnetic field and is typically held in a cup-shaped core that concentrates the coil's magnetic field on the front area of the sensor. The oscillator 54 is configured to produce a radio frequency that helps generate the electromagnetic field. The trigger switch 55 senses the change in amplitude of oscillation and produces a corresponding signal that is sent to the output circuit 56. The output circuit 56 typically comprises a transistor. After receiving a signal from the trigger switch 56, the transistor switches on to produce an output signal. As explained above, the inductive proximity sensor 50 operates on the basis of Faraday's law of induction.

Although only a number of examples have been disclosed herein, other alternatives, modifications, uses and/or equivalents thereof are possible. Furthermore, all possible combinations of the described examples are also covered. Thus, the scope of the present disclosure should not be limited by the particular examples disclosed herein.

What is claimed is:

1. A system comprising:
   a driving component including a motor;
   a driven component;
   a torque limiter positioned between the driving component and the driven component, the driving component being coupled to a driving end of the torque limiter, the driven component being coupled to a driven end of the torque limiter, the torque limiter being configured to assume a normal operating state with no slippage between the driving and driven ends of the torque limiter and an over-torque operating state with slippage occurring between the driving and driven ends of the torque limiter, the torque limiter including a metal moving part that assumes a first position when the torque limiter is in the normal operating state and a second position different than the first position when the torque limiter assumes the over-torque operating state; and
   an inductive proximity sensor that is configured to generate an output signal upon detecting the metal moving part to be in one of the first position or second position, when the metal moving part is in the other of the first position or second position the inductive proximity sensor is configured not to generate the output signal;
   the system being a part of an underwater vehicle and the driven component being a fin that is configured to assist in navigating the underwater vehicle, the motor, the torque limiter and the inductive proximity sensor residing inside the underwater vehicle, the fin residing outside the underwater vehicle.

2. The system according to claim 1, wherein the inductive proximity sensor is configured to generate the output signal upon detecting the metal moving part to be in the first position and to not generate the output signal when the metal moving part is in the second position.

3. The system according to claim 2, wherein the inductive proximity sensor includes a coil that is configured to generate an electromagnetic field sufficient to create an eddy current in the metal moving part of the torque limiter when the metal moving part is in the first position.

4. The system according to claim 3, wherein the metal moving part has a circumferential lip portion that protrudes radially from a body of the torque limiter, the inductive proximity sensor being arranged such that the electromagnetic field creates an eddy current in the lip portion of the metal moving part when the metal moving part is in the first position.

5. The system according to claim 1, wherein the inductive proximity sensor is configured to generate the output signal upon detecting the metal moving part to be in the second position and to not generate the output signal when the metal moving part is in the first position.

6. The system according to claim 5, wherein the inductive proximity sensor includes a coil that is configured to generate an electromagnetic field sufficient to create an eddy current in the moving part of the torque limiter when the metal moving part is in the second position.

7. The system according to claim 6, wherein the metal moving part has a circumferential lip portion that protrudes radially from a body of the torque limiter, the inductive proximity sensor being arranged such that the electromagnetic field creates an eddy current in the lip portion of the metal moving part when the metal moving part is in the first position.

8. The system according to claim 1, further comprising a controller that is configured to receive the output signal of the inductive proximity sensor and to control one or more of a rotation rate of the motor and a rotation direction of the motor.

9. The system according to claim 1, wherein the torque limiter is a ball detent type limiter, and the metal moving part is a floating plate that is supported at least in part by a plurality of balls.

10. The system according to claim 1, further comprising a controller that is configured to receive the output signal of the inductive proximity sensor, the controller being configured to control one or more of a rotation rate of the motor and a rotation direction of the motor upon the controller receiving the output signal, the controller being a part of a navigation control system of the underwater vehicle.

11. A system comprising:
   a driving component including a motor;
   a driven component;
   a torque limiter positioned between the driving component and the driven component, the driving component being coupled to a driving end of the torque limiter, the driven component being coupled to a driven end of the torque limiter, the torque limiter being configured to assume a normal operating state with no slippage between the driving and driven ends of the torque limiter and an over-torque operating state with slippage occurring between the driving and driven ends of the torque limiter, the torque limiter including a metal moving part that assumes a first position when the torque limiter is in the normal operating state and a second position different than the first position when the torque limiter assumes the over-torque operating state;
   an inductive proximity sensor that is configured to generate an output signal upon detecting the metal moving part to be in one of the first position or second position, when the metal moving part is in the other of the first position or second position the inductive proximity sensor is configured not to generate the output signal; and a controller that is configured to receive the output signal of the inductive proximity sensor and to control at least one of a rotation rate of the motor and a rotation direction of the motor.

12. The system according to claim 11, wherein the inductive proximity sensor is configured to generate the output signal upon detecting the metal moving part to be in the first position and to not generate the output signal when the metal moving part is in the second position.

13. The system according to claim 11, wherein the inductive proximity sensor is configured to generate the output signal upon detecting the metal moving part to be in the second position and to not generate the output signal when the metal moving part is in the first position.

14. The system according to claim 11, wherein the system is a part of an underwater vehicle and the driven component is a fin that is configured to assists in navigating the underwater vehicle, the motor, the torque limiter and the inductive proximity sensor residing inside the underwater vehicle, the fin residing outside the underwater vehicle.

15. The system according to claim 11, wherein the torque limiter is a ball detent type limiter, and the metal moving part is a floating plate that is supported at least in part by a plurality of balls.

16. The system according to claim 14, wherein the controller is a part of a navigation control system of the underwater vehicle.

17. A system comprising:
a driving component including a motor;
a driven component;
a torque limiter positioned between the driving component and the driven component, the driving component being coupled to a driving end of the torque limiter, the driven component being coupled to a driven end of the torque limiter, the torque limiter being configured to assume a normal operating state with no slippage between the driving and driven ends of the torque limiter and an over-torque operating state with slippage occurring between the driving and driven ends of the torque limiter, the torque limiter including a metal moving part that assumes a first position when the torque limiter is in the normal operating state and a second position different than the first position when the torque limiter assumes the over-torque operating state, the torque limiter being a ball detent type limiter, and the metal moving part is a floating plate that is supported at least in part by a plurality of balls; and
an inductive proximity sensor that is configured to generate an output signal upon detecting the metal moving part to be in one of the first position or second position, when the metal moving part is in the other of the first position or second position the inductive proximity sensor is configured not to generate the output signal.

18. The system according to claim 17, further comprising a controller that is configured to receive the output signal of the inductive proximity sensor and to control at least one of a rotation rate of the motor and a rotation direction of the motor.

19. The system according to claim 17, wherein the system is a part of an underwater vehicle and the driven component is a fin that is configured to assists in navigating the underwater vehicle, the motor, the torque limiter and the inductive proximity sensor residing inside the underwater vehicle, the fin residing outside the underwater vehicle.

* * * * *